Aug. 9, 1966   J. REYS   3,265,124
COATED GRAPHITE PRODUCTS
Filed July 10, 1964

INVENTOR.
JOHN REYS
BY
Oberlin, Maky & Donnelly
ATTORNEYS 3,265,124
COATED GRAPHITE PRODUCTS
John Reys, Chagrin Falls, Ohio, assignor to Falls Industries Incorporated, Solon, Ohio, a corporation of Ohio
Filed July 10, 1964, Ser. No. 381,643
10 Claims. (Cl. 165—133)

This invention relates generally as indicated to coated graphite products, and more particularly to such products which are suitable for use in heat exchangers.

Graphite products are presently employed for a variety of purposes where corrosive or highly reactive chemicals are handled, including heat exchangers. Since graphite is chemically inert but has high thermal stability, it is especially suitable for such use. Moreover, in view of the nature of many of the fluids to be handled, it is often essential that a material such as this be used.

A preferred form of graphite which has been chemically treated to render it impervious to the seepage of fluids is commercally marketed under the trademark "Impervite" and has the following physical properties:

PHYSICAL PROPERTIES

Mechanical:
- Density (lbs./cu. ft.) _____ 109
- Porosity (percent) effective _____ none
- Tensile strength (p.s.i.) _____ 2600
- Compressive strength (p.s.i.) _____ 8900
- Transverse strength (p.s.i.) _____ 4650
- Modulus of elasticity ($10^5$) _____ 23

Thermal:
- Temperature resistance (° F.) max. _____ 340
- Thermal expansion (in./in./° F.$\times 10^{-7}$) ____ 25.4
- Thermal conductivity (B.t.u./hr./sq. ft./° F./in.) _____ 1020

Such treated graphite is especially suitable for use in heat exchangers since it is immune to the effects of thermal shock, possesses an extremely high rate of thermal conductivity, is subject to minimum thermal expansion, and is inert to practically all corrosives with the exception of a few highly oxidizing agents. The foregoing characteristics are thus obviously advantageous and often essential in the handling of certain fluids.

In spite of the numerous advantages of the above-described treated graphite, experience has demonstrated that, when heat exchangers are used in certain industries, as for example the fertilizer industry in processes for the concentration of crude phosphoric acid, large deposits of calcium sulphate and other scale formations will occur on the surfaces of the heat exchanger tubes. Over a period of time, such scale formation material affects the efficiency of the heat exchanger, requiring that the process be terminated and the heat exchangers be dismantled and cleaned. Termination of the industrial process is not only extremely undesirable economically, but moreover it is very difficult to remove the scale deposits from the heat exchanger tubes, particularly when the deposits are on the inner surface.

It is accordingly a principal object of this invention to provide a novel coated graphite product which will be resistant to the formation of scale deposits thereon.

It is another object of this invention to provide a coated graphite product which is particularly suitable for use in heat exchangers which combines the previously known advantages of graphite with a resistance to surface formations of scale deposits.

Another object of this invention is to provide a coated graphite heat exchanger tube which has been substantially uniformly coated with a chemically inert high thermal stability resin to resist scale formation without adversely affecting the heat transfer and corrosion resistance of the graphite tube.

Other objects, advantages, and features of this invention will be apparent to those skilled in the art after a reading of the following more detailed description.

These and other objects are achieved by means of this invention in which a coated graphite product is provided which comprises a graphite article with a substantially uniform coating of a chemically inert high thermal stability anti-fouling resin of approximately 1 mil or less in thickness on its surface, and which has been impregnated with a thermosetting resin to render the coated article impervious to fluid seepage.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
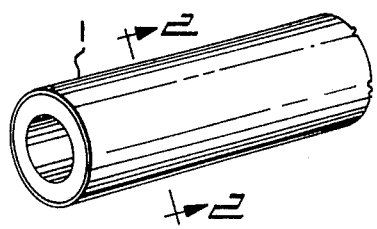
FIG. 1 is a perspective view of a preferred form of the invention.
Figure 3:
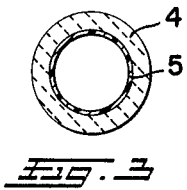
FIG. 3 is a sectional view similar to FIG. 2 illustrating also in exaggerated dimensions, a somewhat modified form of the FIG. 1 embodiment.
Figure 2:
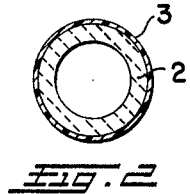
FIG. 2 is a cross-sectional view taken on line 2—2 of FIG. 1, illustrating in exaggerated dimensions the various components of the coated graphite tube.

Referring now to the drawings and more particularly to FIGS. 1–3, a hollow coated graphite tube is illustrated designated generally by the numeral 1. As shown more clearly in the cross-sectional view of FIG. 2, a graphite tube 2 is provided which has a relatively thin substantially uniform coating 3 of a chemically inert high thermal stability anti-fouling resin on its external surface. The graphite article is impregnated with a thermosetting resin to render it impervious to seepage of fluids. FIG. 3 illustrates a modified embodiment in which the hollow graphite tube 4 has its internal surface coated as shown at 5 by a chemically inert high thermal stability resin. This embodiment of the graphite tube is also impregnated with a thermosetting resin.

As mentioned above, the resin with which the graphite article is coated to preclude scale formation must be both chemically inert and have high thermal stability to be suitable for use in a heat exchanger. Such resin must also produce a substantially smooth and slick surface on the article to prevent formation of the undesired deposits. A particularly suitable such resin is polytetrafluoroethylene which is commercially available under the trade name "Teflon." A similar substance and one equally suitable is polytrifluorochloroethylene which is sold commercially under the trade name "Kel-F." Other similar materials may also be used, although Teflon and Kel-F are the preferred materials. The coating may be sprayed onto the graphite article and may be applied either internally or externally of the graphite tube illustrated in FIGS. 1–3. The coating should be relatively thin, preferably approximately 1 mil or less in thickness, and applied substantially uniformly about the surface so that the heat transfer properties of the graphite article will not be substantially reduced. Since the resin tends to have a closed cell structure, if the coating is of a greater thickness it will thus be too much of an insulator for the tube to be suitable for the desired usage. Such a coating will also afford a certain amount of additional corrosion resistance to the graphite article and thus permit its employment even under somewhat oxidizing conditions.

The coated graphite article is impregnated with a thermosetting resin, which will generally be one of the commercially available phenolic or furan based resins, to render the graphite article impervious to fluid seepage by filling the pores formed between adjacent graphite particles which have been bonded together during the molding process.

Figure 4:
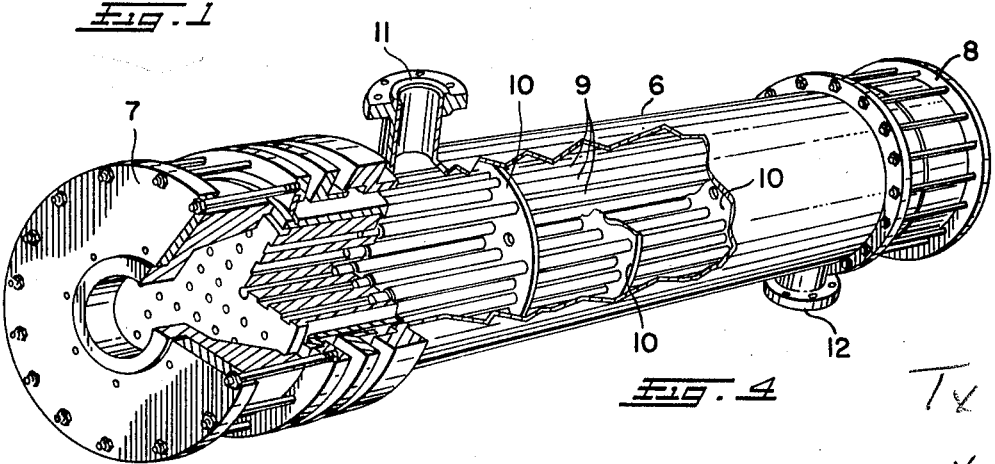
FIG. 4 is a partial cut-away isometric view of a typical heat exchanger in which this invention may desirably be employed.

Referring now to FIG. 4, a conventional heat exchanger is illustrated which is typical of those in which coated graphite products, such as those illustrated in FIGS. 1–3, may be employed. As shown, the heat exchanger comprises an elongated cylindrical shell 6 with end plates 7 and 8 on the opposite ends and a plurality of heat exchanger tubes 9 positioned therein between the end plates. A series of baffles 10 are provided within the shell transversely of the tubes in a spaced-apart relation to divert the flow of fluid therethrough. An inlet and outlet 11 and 12 are provided for the fluid to be passed through the heat exchanger. The heat exchanger tubes may be of the type illustrated in either FIG. 2 or FIG. 3, being coated either internally or externally with a thin substantially uniform coating of Teflon or Kel-F.

Figure 5:
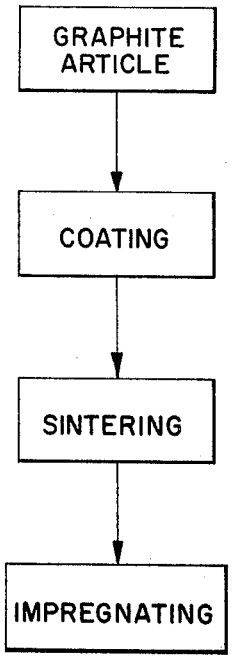
FIG. 5 is a flow sheet illustrating the method by which the coated graphite product of this invention may be formed.

In FIG. 5, the process for producing the graphite articles of this invention is schematically illustrated. A graphite article is first coated, generally by spraying, with Teflon or Kel-F of approximately 1 mil or less in thickness so that the coating is substantially uniform about the surface of the article. After the article is coated, it will be taken to a sintering furnace where it will be sintered in the conventional manner at a temperature of about 720° F. (when Teflon is used) to provide a smooth substantially continuous surface. The sintering temperature is, of course, variable and depends upon the particular resin used. The appropriate sintering temperature for the above-mentioned resins will be readily ascertainable by those skilled in the art. The coated graphite article will thereafter be impregnated with a thermosetting phenolic or furan based resin and cured at a relatively low temperature (generally on the order of about 400° F., although the exact temperature is variable depending upon the particular thermosetting resin used) to render the article impervious to fluid seepage. Since impregnating resins of this type are generally incapable of withstanding temperatures on the order of 700° F. which are usually employed in the sintering operation, the impregnating process will follow rather than precede the sintering step.

Coated graphite products of the type described herein may also suitably be used as graphite safety rupture discs, i.e., discs which are designed to rupture at a predetermined pressure, in various systems wherein it is necessary to prevent chemicals from building up on the surface of the discs and preventing such rupture. Reference may also be made to my prior patent, 2,887,303, entitled "Heat Exchanger" for a disclosure of a heat exchanger employing impervious graphite parts wherein the concept of this invention may also advantageously be utilized.

Other modes of applying the principle of the invention may be employed, change being made as regards the details described, provided the features stated in any of the following claims, or the equivalent of such, be employed.

I, therefore, particularly point out and distinctly claim as my invention:

1. A coated graphite product comprising a graphite article, a smooth, substantially uniform coating of a chemically inert high thermal stability anti-fouling resin selected from the group consisting of polytetrafluoroethylene and polytrifluorochloroethylene of approximately 1 mil or less in thickness on the surface of said article, and impregnated with a thermosetting resin to render the coated article impervious to fluid seepage.

2. A heat exchanger tube comprising a graphite tube, a smooth, substantially uniform coating of a chemically inert high thermal stability anti-fouling resin selected from the group consisting of polytetrafluoroethylene and polytrifluorochloroethylene on one surface of approximately 1 mil or less in thickness, and impregnated with a thermosetting resin to render the tube impervious to fluid seepage.

3. The heat exchanger tube of claim 2 wherein said tube is coated internally with said resin.

4. The heat exchanger tube of claim 2 in which said tube is coated externally with said resin.

5. In a heat exchanger including an elongated cylindrical shell, end plates on opposite ends thereof, a plurality of heat exchanger tubes secured within said shell between said end plates, a series of baffle plates spaced apart within said shell transversely of the tubes, and an inlet and outlet for the passage of fluid therethrough, the improvement comprising said tubes being of graphite with a smooth, substantially uniform coating of a chemically inert high thermal stability anti-fouling resin of approximately 1 mil or less in thickness on one surface and impregnated with a thermosetting resin to render the tubes impervious to fluid seepage.

6. The heat exchanger of claim 5 wherein said tubular elements are coated internally with said resin.

7. The heat exchanger of claim 5 wherein said tubular elements are coated externally with said resin.

8. The heat exchanger of claim 5 in which said resin is selected from the group consisting of polytetrafluoroethylene and polytrifluorochloroethylene.

9. A coated graphite product comprising a graphite article with a smooth, substantially uniform coating of a chemically inert high thermal stability anti-fouling resin of approximately 1 mil or less in thickness on its surface, said graphite article being impregnated with a thermosetting resin to render the article impervious to fluid seepage.

10. The product of claim 9 in which said product is a heat exchanger tube.

References Cited by the Examiner

UNITED STATES PATENTS

| | | | |
|---|---|---|---|
| 2,655,350 | 10/1953 | Gaylord | 165—180 X |
| 2,907,671 | 10/1959 | Duvivier | 117—72 X |
| 2,917,404 | 12/1959 | Melzer et al. | 117—95 X |

ROBERT A. O'LEARY, *Primary Examiner.*

M. A. ANTONAKAS, *Assistant Examiner.*